(12) United States Patent
Chen et al.

(10) Patent No.: US 6,233,105 B1
(45) Date of Patent: May 15, 2001

(54) METHOD OF DISK FORMATTING

(75) Inventors: Hsuan-Tung Chen; Kuang-Hsin Lin, both of Taipei (TW); Miao Liu, Tianjin (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/280,902

(22) Filed: Mar. 29, 1999

(51) Int. Cl.[7] ........................................................ G11B 5/09

(52) U.S. Cl. ............................................. 360/48; 707/205

(58) Field of Search ................................ 360/48; 707/205

(56) References Cited

U.S. PATENT DOCUMENTS 5,873,118 * 2/1999 Letwin ................................. 711/156

* cited by examiner

*Primary Examiner*—Alan T. Faber
(74) *Attorney, Agent, or Firm*—W. Wayne Liauh

(57) ABSTRACT

A method for quickly formatting a disk is disclosed. It can save lots of time when a disk or a disk partition is formatted. The technique of this invention redirects the interrupt instruction of the BIOS to get the disk (or disk partition) information which includes the sector number, starting location and type thereof. According to the disk (or disk partition) type (FAT 16 or FAT 32), the section number of the file allocation table (FAT) is rearrange by a logical operation unit. Then write the boot record to the mapped location and clear the FAT and file directory to zero to accomplish disk formatting procedure.

11 Claims, 2 Drawing Sheets

| Partition size (MB) | Sectors per cluster |
|---|---|
| 16~127 | 4 |
| 128~255 | 8 |
| 256~511 | 16 |
| 512~1023 | 32 |
| 1024~2047 | 64 |

METHOD OF DISK FORMATTING

BACKGROUND OF THE INVENTION

This invention relates to a disk drive system, and more particularly to a method for quickly formatting a disk.

A typical computer system includes a microprocessor, a memory and various peripherals. The disk drive is one of the peripherals for storing operating system files, application programs, data files and, in general, any information that user wishes to save for subsequent access. Both hard disk and floppy disk require the step of doing a start-up process before using the disk. The start-up process is called formatting. Currently, under the DOS and Windows environments, the formatting process is done by the "format" command that provided by Microsoft Company. The disk is divided and numbered into Sectors and Tracks, then the information about the Sectors and Tracks is written into the FAT and file directory that are previously built therein. FIG. 1 is a partition 10 structure diagram including a boot record 11, a first FAT 12, a second FAT 13, a file directory 14 and a data record area 15. Where file directory 14 consists of many file directory items 141 to store and provide the message about the data which stored in the data record area 15 such as file name, extension file name, creation time and etc. Using the format command to format a disk is time-consuming; for example, it needs 20 minute to format a 3 gaga-byte hard disk. Although Microsoft has provided a quick formatting command "format/q", it can be used only in the condition that the disk is unnecessary to be completely formatted (i.e. the disk has been formatted before) and besides not in the conditions listed below:

1. The disk is low level formatted.
2. The disk is repartitioned.
3. The disk has bad sectors.

The format command that Microsoft provided is time-consuming and the quick format command is restricted to particular conditions of the disk such as the disk is not low level formatted or the disk is not repartitioned and etc. It means that the quick format command "format/q" is work only for a disk that is formatted and had no bad sectors, not suites for any disks' formatting.

SUMMARY OF INVENTION

This invention is providing a method to format a disk (or disk partition) quickly, and it works on the conditions when the disk is only low level formatted, repartitioned and even has bad sector(s) thereon.

The technique of this invention is performing the interrupt INT 13h of the BIOS to get disk's parameters including the total sector number of disk (or disk partition), the location of the boot record, the type of disk and the number of disk that is needed when formatting, and then recalculate the disk sectors by a logic operation unit, rewrite the result into the boot record of the original disk (or disk partition). The structure of the boot record consists of five parts as follows 1. Jump Instruction, 3 bytes.
2. OEM names, 8 bytes.
3. DPB, which is different between FAT 16 and FAT 32.
4. Bootstrap code, is a starting procedure, it duplicates the IO.dos and command.com after disk is formatted so that the computer can be startup.
5. End with 5 5 aa In accordance with the structure described above the disc properties block (DPB) is different between FAT16 and FAT32 but the other parts are the same and fixed. Table 1 and table 2 are structures of the DPB of FAT16 and FAT32 respectively. The major technique of this invention is the calculation of DPB. Referring to table 1 and table 2, it is obvious that the data of DPB has many differences between FAT16 and FAT32; for example, the maximum file directory item of FAT16 is 0x002 but is 0 in FAT32. After the interrupt INT 13h of BIOS is performed, the disk parameter was read out and equation (1):

$$sfat=(stotal\ 0x21)/(1+s*0x100)+1$$

and equation (2):

$$sfat=(stotal\ 0x23)/(1+8*0x080)+1$$

are used to calculate the sector number of every FAT in the logic operation unit, then the number is written into the mapped place in the boot record and the FAT and file directory are cleared to zero and the media number is written into starting place of FAT.

It is necessary to notice that there are three boot records in the FAT32 system, the first one is the DPB which is similar to the FAT16 system, the second one records the size of free space, if the unit is the cluster of the portion, which is equal to (stotal 2*sfat 0x20)/8−1 and the third one is the bootstrap code which won't affect the calculation.

TABLE 1

DPB structure of FAT16 system, located at the 0Bth byte of the first sector of the disk partition

| Location | Contents |
| --- | --- |
| 0B-0C | Bytes per sector (0x0002 = 512) |
| 0D | Sectors per cluster (decide by size of partition) |
| 0E-0F | Reserved (0x0100) |
| 10 | Number of FAT (0x02) |
| 11-12 | Maximum number of file directory items (0x0002) |
| 13-14 | Total sectors (0, maximum is 65535) |
| 15 | Media description code (0xf8) |
| 16-17 | Sectors per FAT (equation 1) |
| 18-19 | Sectors per track |
| 1A-1B | Head number |
| 1C-1D | Hidden sectors (no influence to the result) |
| 20-23 | Total sector number if byte 13-14 is 0 |
| 24 | Physical drive number (first = 0x80, second = 0x81) |
| 25 | Reserved |
| 26 | Characteristic byte of extension index record (0x29) |
| 27-2A | Serial number of disk (generate randomly) |
| 2B-35 | Label (11 bytes) |
| 36-3D | File system type (FAT16) |

TABLE 2

DPB structure of FAT32 system, located at the 0Bth byte of the first sector of the disk partition

| Location | Contents |
| --- | --- |
| 0B-0C | Bytes per ecotr (0x0002 = 512) |
| 0D | Sectors per cluster (decide by size of partition) |
| 0E-0F | Reserved (0x0100) |
| 10 | Number of FAT (0x02) |
| 11-12 | Maximum number of file directory items (0) |
| 13-14 | Total sectors (0) |
| 15 | Media description code (0xf8) |
| 16-17 | Sectors per FAT (0) |
| 18-19 | Sectors per track |
| 1A-1B | Head number |
| 1C-1F | Hidden sectors (no influence to the result) |
| 20-23 | Total sector number if byte 13-14 is 0 |
| 24-27 | Sector per FAT (equation 2) |

TABLE 2-continued

DPB structure of FAT32 system, located at the 0Bth byte of the first sector of the disk partition

| Location | Contents |
| --- | --- |
| 28-29 | File system Ver. (major) (0) |
| 2A-2B | File system Ver. (minor) (0) |
| 2C-2D | Number of file directories first cluster (0x02000) |
| 2E-2F | High bytes of the file directory s first cluster |
| 30-31 | FSINFO Sector number (0xffff if not exist) |
| 32-33 | Backup boot sectors (0xffff if not exist) |
| 34-3F | Reserved |
| 40 | Physical drive number (first = 0x80, second = 0x81) |
| 41 | Reserved |
| 42 | Characteristic byte of extension index record (0x29) |
| 43-46 | Serial number of disk (generate randomly) |
| 47-51 | Label (11 bytes) |
| 52-59 | File system type (FAT32) |

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE PREFERRED EMBODIMENT

This invention is using the INT 13h BIOS interrupt to perform disk formatting. Before describing the invention in detail, a brief introduction will be provided for the function of 02h, 03h and 08h of INT 13h BIOS interrupt, used registers and relative programs.

1. 02h: Read one or more disk sectors into a buffer.

Register:
 AH 02h (cmd)
 AL number of sectors to be read (nsectd)
 ES: BX pointer to disk buffer (Buffer)
 CH track number (Track)
 CL sector number (Sector)
 DH head number (Head)
 DL number of disk drive (Drive)

The needed sector will be stored in the storage area after function is ended. The relative Borland C++ program function is:

biosdisk (0x02, int drive, int head, int track, sector, int nsects, void *buffer).

2. 03h: Write one or more sectors to a disk

Register:
 AH 03h (cmd)
 AL number of sectors to written (nsectd)
 ES: BX pointer to disk buffer (Buffer)
 CH track number (Track)
 CL sector number (Sector)
 DH head number (Head)
 DL number of disk drive (Drive)

The relative Borland C++ program function is:

biosdisk (0x03, int drive, int head, int track, sector, int nsects, void *buffer).

3. 08h: Get drive parameters

Register:
 AH 08h
 DL number of disk drive

Return register:
 CH (low 6 bit) sectors per track
 DH head number

The relative Borland C++ program function is:

union REGS inreg, outreg;

unsigned f, g;

inreg.h.ah=8;

inreg.h.al=0x80; (Remark: 0x80 is the first diskette, 0x81 is the second diskette and so on) int86(0x13, &inreg, &outreg);

f=(outreg.h.cl&63); and g=outreg.h.dh+1.

Figure 3:
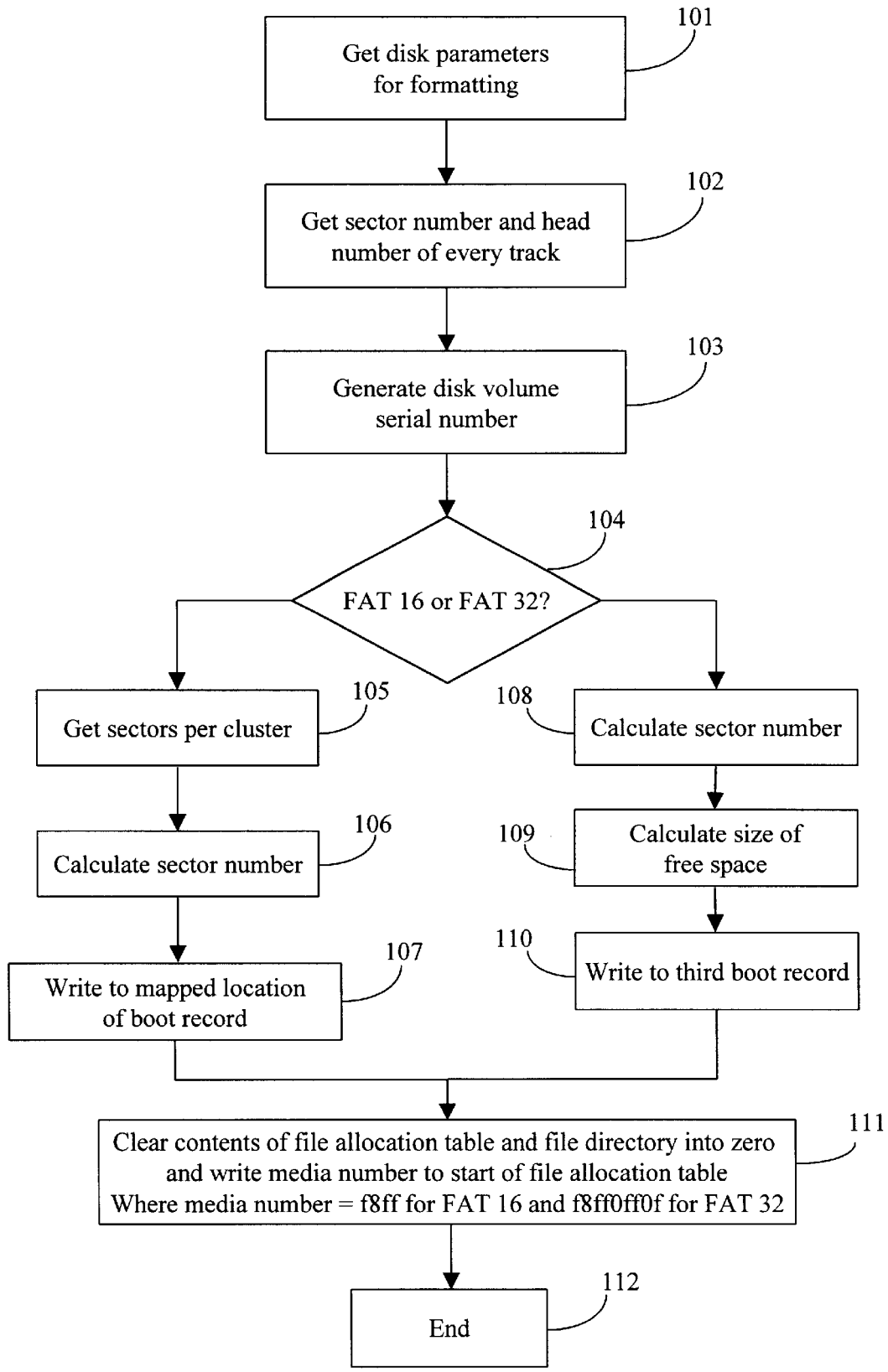
FIG. 3 is the formatting flow chart of this invention.

With reference to FIG. 3, the present invention of disk formatting steps describes as follow:

Step 101: The logic operation unit gets the parameters needed for disk formatting by function 02h of INT 13h BIOS interrupt, including total sectors of disk (or disk partition), location of boot record, disk type and disk number.

Step 102: The logic operation unit gets the numbers of track and numbers of head by function 08h of INT 13h BIOS interrupt.

Step 103: Generate a disk volume serial number randomly.

Step 104: Determine the disk or disk partition is FAT 16 system or FAT 32 system. Since the DPB is different between FAT 16 system and FAT 32 system, the process is different. If the disk system is FAT 16 then go to step 105; otherwise, go to step 108.

Figures 1, 2:
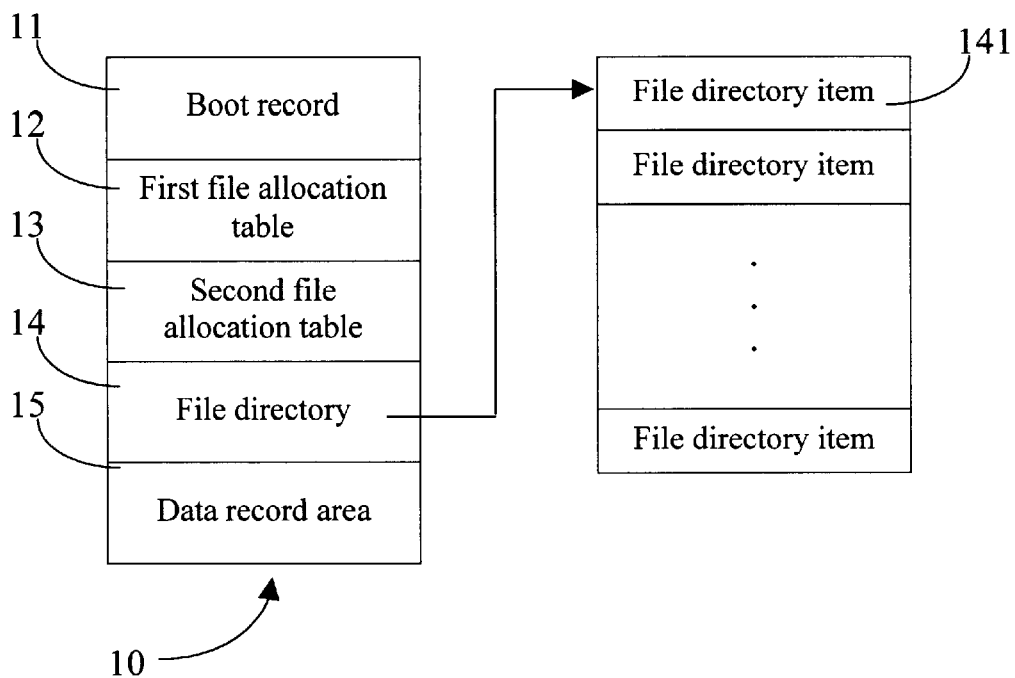
FIG. 1 is a block diagram of disk partition structure.
FIG. 2 is the map relation between the size of disk partition and the sector per cluster in FAT16 system.

Step 105: Get the sector number of every cluster. If the file system is FAT16 system the sector number of clusters will increase by $2^n$ power accordance to the increases of partition size. FIG. 2 shows the condition of partition size 16 and the sector number of every cluster 17. If the disk capacity is between 16 MB and 127 MB, the sector number is 4 in every cluster.

Step 106: Calculate the number of FAT with equation (1) in logic operation unit.

$$\text{sfat} = (\text{stotal } 0x21)/(1+s*0x00)+1 \tag{1}$$

Wherein sfat is the sector number of FAT; stotal is the total sector number; s is the sectors per cluster.

The calculation process is as follows:

First, there are 512 bytes in every sector, boot record is 1, number of root directory is 32, and sdata is sector number of data areas. The disk or disk partition has total sectors as:

$$\text{stotal}=1+\text{sfat}+32+\text{sdata} \tag{1-1}$$

Then every 2 bytes in FAT pointing to a cluster in data area, we have:

$$\text{sfat}*512/2=\text{sdata}/s \tag{1-2}$$

Rearranging (1-2), we have:

$$\text{sdata}=\text{sfat}*s*256 \tag{1-3}$$

Substituting (1-3) to (1-1), we have:

$$\text{stotal}=1+\text{sfat}+32+\text{sfat}*s*256 \tag{1-4}$$

Solving the sfat of (1-4), we have:

$$\text{sfat}=(\text{stotal } 33)/(1+s* 256)+1 \tag{1-5}$$

In equation (1-5), since sfat is an integer, we add 1 to sfat for making up the rounded part; then transform equation (1-5) to hexadecimal form and obtain equation (1).

Step 107: Perform function 03h of INT 13 BIOS interrupt to write the data that obtained from step 106 to the referenced location of boot record and go to step 110.

Step 108: Use equation (2) to calculate the sector number of FAT in logic operation unit $$\text{sfat}=(\text{stotal } 0x23)/(1+8*0x080)+1 \qquad (2)$$

Wherein sfat is the sector number of FAT; stotal is the total sector number; s is the number of sectors per cluster.

The calculation process is as follows:

Since the disk system is FAT 32, every cluster is pointed by 4 bytes. There are 8 sectors per cluster and 512 bytes per sector. Boot record number of FAT 16 is 3. Sector number of file directory is 32. We have $$\text{sfat}*512/4=\text{sdata}/8 \qquad (2-1)$$

Rewriting (2-1), we have:

$$\text{sdata}=\text{sfat}*8*128 \qquad (2-2)$$

Substituting (2-2) to (1-1), we have:

$$\text{stotal}=3+\text{sfat}+32+\text{sfat}*8*128 \qquad (2-3)$$

Solving sfat of (2-3), we have:

$$\text{sfat}=(\text{stotal } 35)/(1+8*128)+1 \qquad (2-4)$$

Similarly, since sfat is an integer, we add 1 to sfat for making up the rounded part; then transform equation (2-4) to hexadecimal form and obtain equation (2).

Step 109: Use equation Free Space=(stotal 2*sfat 0x20)/8 1 to calculate the size of free space.

Step 110: Perform the function 03h of INT 13h BIOS interrupt to write the data that obtained from step 108 to the referenced location of three boot record respectively.

Step 111: Clear the content of two FAT and file directory to zero sequentially. There are t=sfat*2+32 sectors to be cleared. Then write the media number to the start of FAT, which is f8ff in FAT 16 system and f8ff0ff0f in FAT 32 system.

Step 112: End the formatting process.

For example, a hard disk with 2 GB capacity is divided into two logical partitions by DOS utility F DISK and assigned logical drive names as C and D respectively. Wherein the capacity size of drive D is 1.2 GB. Using the described process of this invention to format the D drive is as follows:

1. Logic operation unit calls function 02h INT 13h BIOS interrupt to read the partition information.

Using Borland C++ function biosdisk (2, 0x80, 0, 0, 1, 1, buffer) to read data including:
(1) total sectors of the partition: 0x259af1
(2) start head number: 0x01
(3) start cylinder number: 0x96
(4) start sector number: 0x01
(5) hard disk number: 0x80 (the first hard disk)
(6): 0x0b (FAT32)

2. Logic operation unit calls function 08h INT 13h BIOS interrupt to read the number of sectors per track f and number of head g:
union REGS inreg, outreg;
unsigned f, g;
inreg.h.ah=8;
intreg.h.a1=0x80;
int86(0x13, &inreg, &outreg);
f=(outreg.h.c1 & 63);
g=outreg.h.dh+1;
We have f=0x3F and g=0xF0.

3. Generate drive number by function random( );

4. Logic operation unit calculates the sector number of FAT:

$$\text{sfat}=(0x259af1\ 0x21)/(1+8*0x80)+1=0x965$$

5. Calculate the free space:

$$\text{Free space}=(0x259af1\ 2*0x965\ 0x20)/8\ 1 =0x4b101.$$

6. Logic operation unit calls function 03h INT 13h BIOS interrupt to write the data about the boot record just calculated to the location where head=0x01, cylinder=0x96, sector=0x01 of the drive.

7. Use a loop to clear the content of two FAT and file directory to zero, and write f8ffff8f (media number) to the start of every FAT.

There are t=sfat*2+32 =4842 sectors to be cleared.

The advantage of this invention is as follows:

1. This invention uses the BIOS interrupt function to calculate and rearrange the content and allocation of boot record, FAT and root directory area, so it can save much of the formatting time.

2. This invention is suitable for FAT 16 system and FAT 32 system.

3. This invention can perform quick formatting on the disk that had been low level formatted, repartitioned, and some bad sectors which are not able to format by conventional quick formatting command "format/q".

It is noted that method for formatting a disk described above are the preferred embodiments of the present invention for the purposes of illustration only, and are not intended as a definition of the limits and scope of the invention disclosed. Any modifications and variations that may be apparent to a person skilled in the art are intended to be included within the scope of the present invention.

What is claimed is:

1. A method for quickly formatting a disk, used in a formatting operation on a disk partition that has a boot record, a file allocation table (FAT) and a file directory, comprising the steps of:

retrieving a disk parameter of the disk partition by a logic operation unit;

generating a volume serial number of the disk partition;

calculating disc properties block data (DPB) and determining whether the disk partition is a FAT 16 type or FAT 32 type, if the disk partition is a FAT 16 type, performing the following steps:
getting the sector number for every cluster as fixed by the disk partition size,
calculating the total sector number,
calculating the number of FAT, and
writing the number of FAT and the disk volume serial number into a mapped allocation of the boot record by the logic operation unit;

if the disk partition is a FAT 32 type, then performing the following steps:
calculating the sector number of FAT,
calculating the size of free space, and
writing the sector number of FAT and the disk volume serial number into the third boot record; and clearing the contents of the FAT and the file directory.

2. The method as claimed in claim 1, wherein the disk parameter is retrieved by calling the function INT 13h of BIOS interrupt by the logic operation unit.

3. The method as claimed in claim 1, wherein the disk parameter includes the number of total sectors, a location of boot record and the type and the number of the disk partition.

4. The method as claimed in claim 1, wherein the disk volume serial number is generated randomly.

5. The method as claimed in claim 1, wherein the contents of the FAT and the file directory are cleared into zero.

6. A method for quickly formatting a disk, comprising the steps of:

retrieving a disk parameter of the disk which includes a boot record, a FAT and a file directory by a logic operation unit;

generating a volume serial number of the disk partition;

retrieving a sector number of the FAT according to the disk parameter by the logic operation unit;

calculating disc properties block data (DPB) and determining whether the disk partition is a FAT16 type or FAT32 type, if the disk partition is a FAT 16 type, performing the following steps:

getting the sector number for every cluster as fixed by the disk partition size, calculating the total sector number, calculating the number of FAT, and writing the number of FAT and the disk volume serial number into a mapped allocation of the boot record by the logic operation unit;

if the disk partition is a FAT 32 type, then performing the following steps:

calculating the sector number of FAT, calculating the size of free space, and writing the sector number of FAT and the disk volume serial number into the third boot record; and clearing the contents of the FAT and the file directory.

7. The method as claimed in claim 6, herein the disk parameter is retrieved by calling the function INT 13h of BIOS interrupt by the logic operation unit.

8. The method as claimed in claim 6, wherein disk parameter includes the number of total sectors, a location of boot record and the type and the number of the disk.

9. The method as claimed in claim 6, wherein the disk volume serial number is generated randomly.

10. The method as claimed in claim 6, wherein the contents of the FAT and the file directory are cleared into zero.

11. The method as claimed in claim 6, wherein the disk is a floppy disk.

* * * * *